US012611919B2

(12) United States Patent 　　　(10) Patent No.:　US 12,611,919 B2

Guandalini et al. 　　　(45) Date of Patent:　Apr. 28, 2026

(54) DOOR GLASS WITH CRYSTAL FLUSH WITH THE OUTER BODY

(71) Applicant: FERRARI S.P.A., Modena (IT)

(72) Inventors: Roberto Guandalini, Modena (IT); Andrea Binotti, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/982,726

(22) Filed: Dec. 16, 2024

(65) Prior Publication Data

US 2025/0196601 A1　　Jun. 19, 2025

(30) Foreign Application Priority Data

Dec. 18, 2023　　(IT) ........................ 102023000026985

(51) Int. Cl.
　B60J 10/79　　　(2016.01)
　B60J 1/00　　　(2006.01)
　B32B 17/10　　　(2006.01)

(52) U.S. Cl.
　CPC .............. B60J 10/79 (2016.02); B60J 1/008 (2013.01); *B32B 17/10293* (2013.01); *B32B 2307/7376* (2023.05); *B32B 2605/00* (2013.01)

(58) Field of Classification Search
　None
　See application file for complete search history.

(56) References Cited

U.S. PATENT DOCUMENTS

| | | | | |
|---|---|---|---|---|
| 4,901,476 | A | * | 2/1990 | Nagashima ............... B60J 10/79 |
| | | | | 49/501 |
| 5,129,193 | A | * | 7/1992 | Karwande ................ B60J 10/24 |
| | | | | 49/374 |
| 5,613,325 | A | * | 3/1997 | Mariel ...................... B60J 10/74 |
| | | | | 49/404 |
| 10,906,272 | B2 | * | 2/2021 | Uebelacker .............. B60J 1/008 |
| 2023/0373280 | A1 | * | 11/2023 | Luedtke ................... B60J 10/79 |

FOREIGN PATENT DOCUMENTS

| | | | | | |
|---|---|---|---|---|---|
| DE | 4028894 | A1 | * | 3/1992 | .............. B60J 1/001 |
| DE | 4221613 | A1 | * | 1/1994 | .............. B60J 1/001 |
| DE | 4413073 | A1 | | 10/1995 | |
| DE | 102015008927 | A1 | * | 1/2017 | .............. B60J 1/001 |
| DE | 102020128617 | A1 | * | 5/2022 | ............ B60J 5/0469 |
| DE | 102021200884 | A1 | * | 8/2022 | ................ B60J 1/17 |
| EP | 0340483 | A2 | * | 11/1989 | .............. B60J 10/79 |
| FR | 2633661 | A1 | * | 1/1990 | .............. B60J 10/79 |
| GB | 2123884 | A | | 2/1984 | |
| GB | 2515525 | A | | 12/2014 | |
| WO | WO-2022245897 | A1 | * | 11/2022 | .............. B60J 10/79 |

OTHER PUBLICATIONS

Italian Search Report for Italian Patent Application No. 202300026985; Filing Date: Dec. 18, 2023, Date of Mailing: Jul. 7, 2023, 6 pages.

* cited by examiner

*Primary Examiner* — Catherine A Kelly

(74) *Attorney, Agent, or Firm* — CANTOR COLBURN LLP

(57) ABSTRACT

Crystal, gasket and door glass of a motor vehicle; wherein the crystal has a first portion with a first thickness and a second portion with a second thickness; wherein said first thickness is greater than said second thickness; wherein the gasket forms with the crystal a first sealing zone and a second sealing zone.

15 Claims, 4 Drawing Sheets

DOOR GLASS WITH CRYSTAL FLUSH WITH THE OUTER BODY

CROSS-REFERENCE TO RELATED APPLICATIONS

This patent application claims priority from Italian patent application no. 102023000026985 filed on Dec. 18, 2023, the entire disclosure of which is incorporated herein by reference.

FIELD OF THE ART

The invention concerns a crystal, a gasket and a door glass of a motor vehicle.

PRIOR ART

As is well known, motor vehicles comprise glazing, in other words, transparent parts through which the driver can see outside. The glazing of a motor vehicle normally comprises: a windscreen, side door glasses, a rear door glass; and possibly a sunroof. The side door glasses are recessed in their respective flanks and comprise glass panes, which can be sliding, fixed or connected to the door by a kinematic mechanism. We also talk about frameless glazing when the door structure stops at the beltline and does not come to interface with the headliner. In particular, in the case of frameless sliding glasses, the glass panes of the side door glasses have their upper end free and, when closed, are pressed tight against a gasket embedded in the body.

Known solutions have the disadvantage that, at the gasket, the distance between the glass of the door glass and the outer surface of the body is approximately 10 mm. This distance essentially constitutes a step, which is distinguishable to the naked eye.

FIG. 2 schematically shows the section along section line II-II of FIG. 1 of a door glass according to the prior art, where the distance between the outer surface of the body and the outer surface of the glass of the door glass is approximately 9 mm.

DISCLOSURE OF THE INVENTION

The object of the present invention is to provide a solution for a side door glass with a "flush glass" effect. In other words, the object of the present invention is to provide a side door glass that is substantially aligned with the outer surface of the body, so as to improve the perceived quality of the motor vehicle.

According to the present invention, a crystal, a gasket, a door glass and a motor vehicle are provided as mentioned in the appended claims.

The dependent claims define particular embodiments of the invention.

BRIEF DESCRIPTION OF THE DRAWINGS

In the following, an embodiment of the invention is described for a better understanding thereof by way of non-limiting example and with reference to the accompanying drawings, wherein.

EMBODIMENTS OF THE INVENTION

Figure 1:
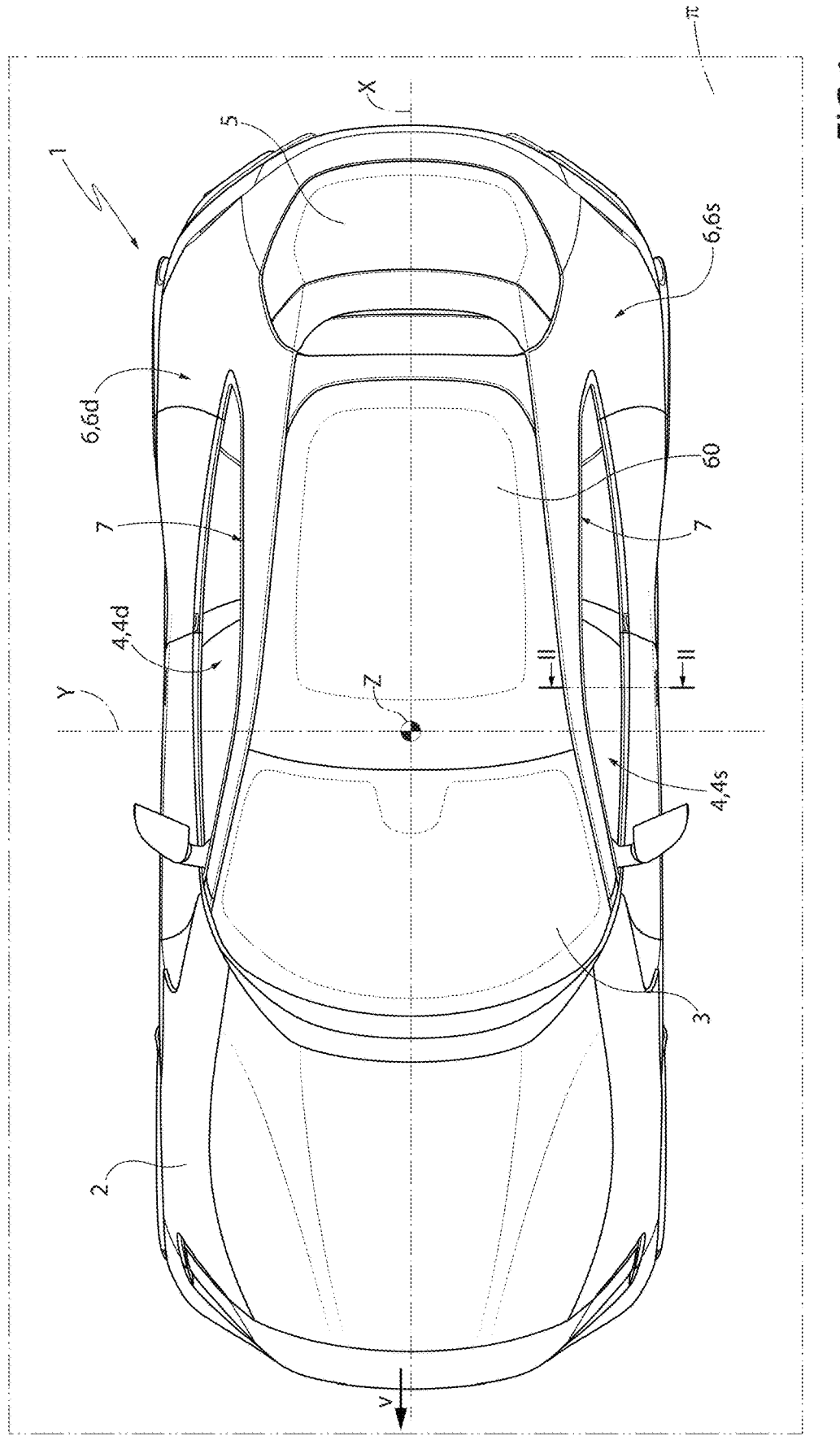
FIG. 1 is a plan and schematic view of a motor vehicle.
Figure 2:
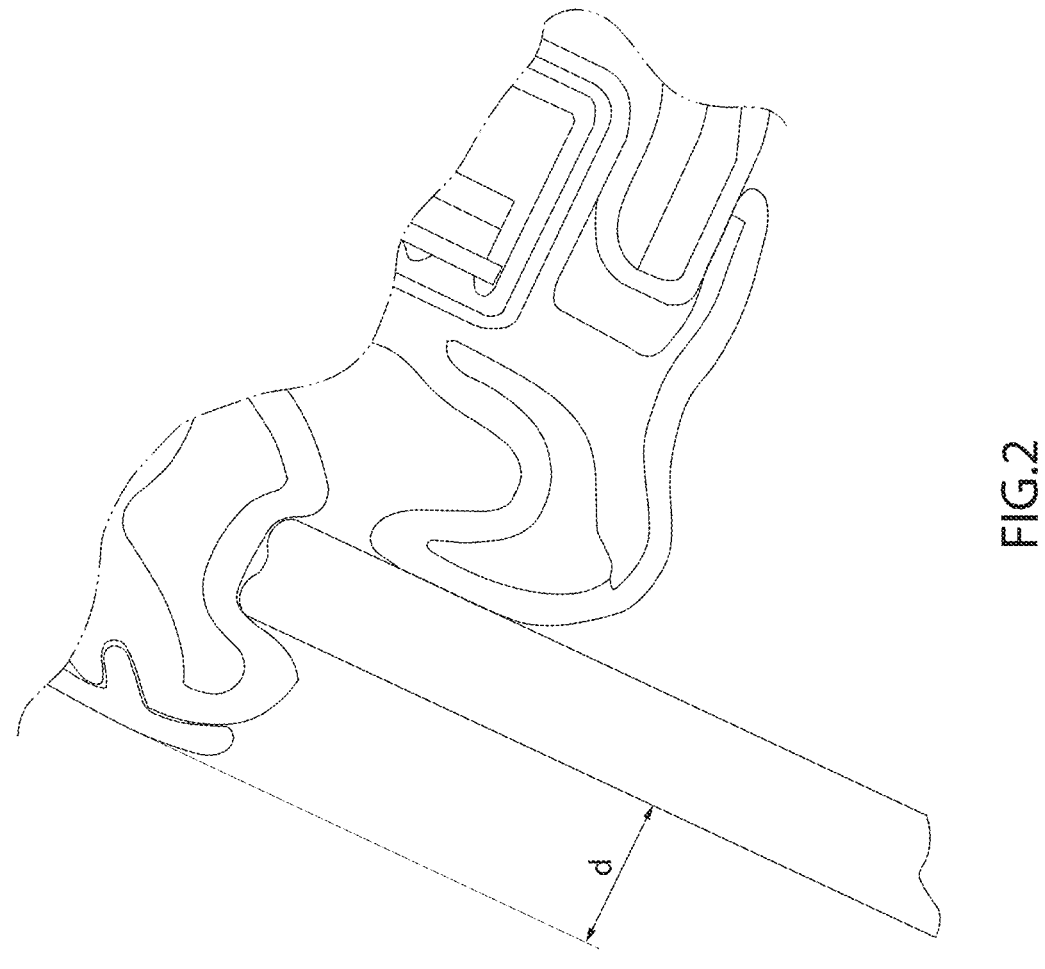
FIG. 2 is a schematic view of a section according to line II-II of FIG. 1 of a door glass according to the prior art.

In FIG. 1, reference number 1 is used to denote a motor vehicle as a whole. As is well known, the motor vehicle 1 comprises a body 2 that has: a longitudinal axis X, generally called the roll axis; a transverse axis Y, generally called the pitch axis; and a vertical axis Z, generally called the yaw axis. The motor vehicle 1 is roto-translating, in a known manner, on a horizontal support plane $\pi$. The following are taken as references: the XYZ axis system and the horizontal support plane n. In particular, the terms "front", "rear", "right", "left", "top", "bottom", "vertical", "horizontal" and the like are used with reference to the motor vehicle 1 in its normal condition of use and moving forward on the horizontal support plane $\pi$ in the forward direction v. The terms "exterior", "interior" and the like are used with reference to the passenger compartment in which the driver of the motor vehicle 1 is seated while driving.

As known and illustrated schematically in FIG. 1, the motor vehicle 1 comprises glazing installed in the body 2. In particular, the motor vehicle 1 comprises: a windscreen 3, a plurality of side door glasses 4, a rear door glass 5, and a sunroof 60.

According to the example illustrated in FIG. 1, the motor vehicle 1 comprises door glasses 4d on the right-hand side and door glasses 4s on the left-hand side, which are specular to each other. The door glasses 4d on the right side and the door glasses 4s on the left side are embedded in a right 6d and, respectively, a left 6s flank of the motor vehicle 1. Without any loss of generality, the number, shape and arrangement of the side door glasses 4 are variable.

In the following, for the sake of brevity, a door glass 4 will be generically described and illustrated, the characteristics of which are to be considered mutatis mutandis valid for both the door glasses 4d on the right and the door glasses 4s on the left.

Each door glass 4 is configured to close, as will be further illustrated below, an opening 7 made through the respective flank 6. The shape and size of the opening 7 are variable.

Each door glass 4 comprises a crystal 8 and a gasket 9. The crystal 8 is a pane with a shape configured to allow the complete closure of the opening 7 itself. The shape of the crystal 8 is variable.

The crystal 8 is recessed (in a known manner) into the flank 6 and is mounted slidably, so that the respective opening 7 can be opened or closed selectively. In particular, the crystal 8 is mounted sliding vertically from a lower position Z1 (illustrated schematically in FIG. 3 and which may coincide in a known and not illustrated manner with a fully open position), to an upper position Z2 (in which the opening 7 is fully closed as illustrated in FIG. 4), and vice versa.

Figure 4:
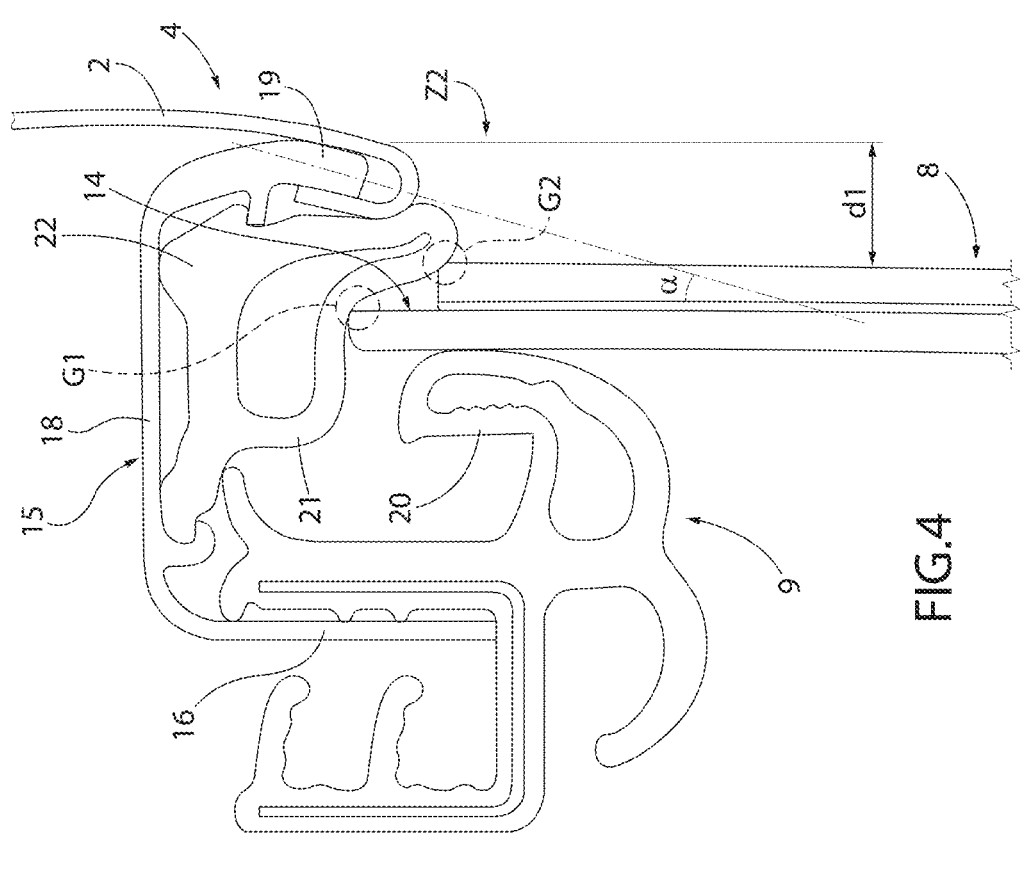
FIG. 4 is similar to FIG. 3 and illustrates the solution according to the present invention in the closed-crystal configuration.
Figure 3:
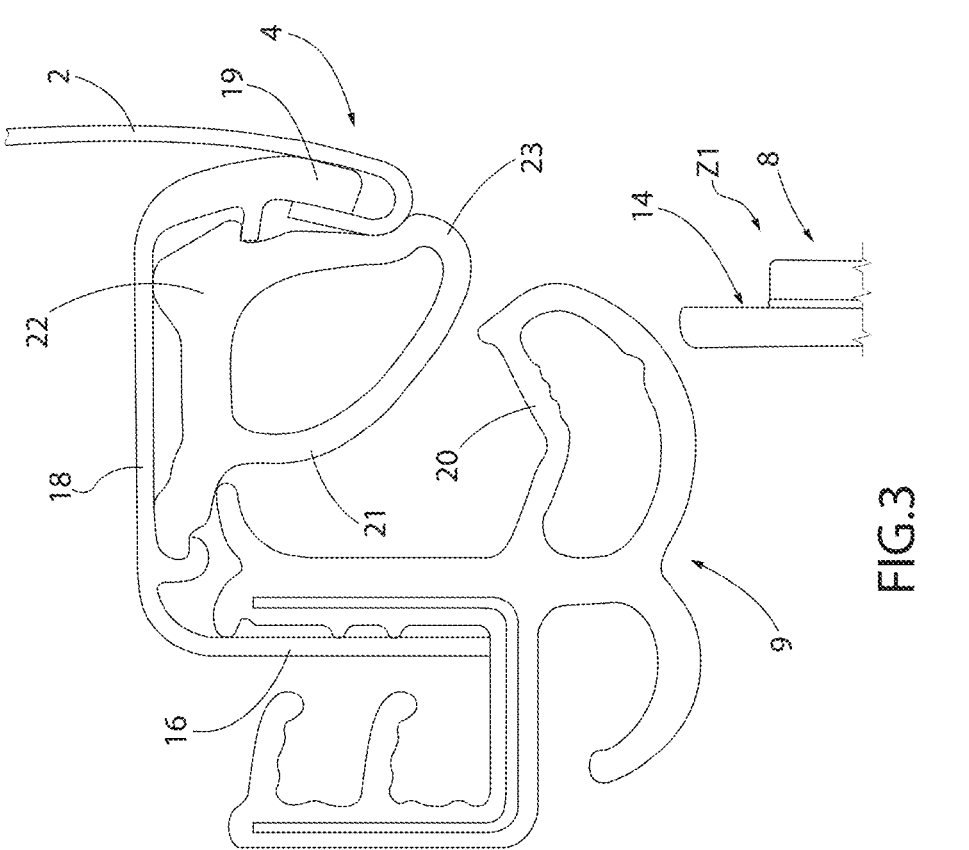
FIG. 3 is similar to FIG. 2 and schematically illustrates a cross-sectional view of a solution according to the present invention, in the open-crystal configuration.

FIGS. 3 to 6 illustrate a door glass 4 according to the present invention. In particular, FIGS. 3 and 4 schematically illustrate the section along the section line II-II of FIG. 1 of a door glass 4 according to the present invention, wherein the distance d1 between the outer surface of the body 2 and the outer surface of the crystal 8 is less than 9 mm, in particular about 4 mm.

According to the present invention, advantageously, the crystal 8 has a variable thickness s. In particular, as will be better illustrated below, the crystal 8 has: a central portion, which closes the opening 7 and has a basic thickness W1; and at least one peripheral portion with a reduced thickness W2. The portion with reduced thickness W2 is configured to interact, in use, with the gasket 9.

Figures 5, 5A, 6:
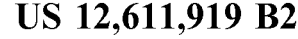
FIG. 5 is a lateral and schematic view of a crystal according to the present invention.
FIG. 5A is the enlargement A of FIG. 5.
FIG. 6 is a schematic view of a cross-section of a crystal according to the present invention.

According to the present invention, the crystal 8 is a laminated glass (FIG. 6). Specifically, the crystal 8 comprises: an inner glass 10, an outer glass 11 and an intermediate layer 12. The inner glass 10 and the outer glass 11 are heat-treated, e.g. tempered. The intermediate layer 12 is made of plastic. The treatments of the inner glass 10 and outer glass 11 are variable and may differ from each other; in other words, the inner glass 10 and outer glass 11 may have undergone different treatments and have different physical and mechanical characteristics.

The inner glass 10 is a pane with a thickness s1 and a lateral perimeter p1, which delimits an area A1. The thickness s1 of the inner glass 10 is comprised between 3 mm and 3.3 mm, preferably 3.15 mm.

The outer glass 11 is a pane with a thickness s2 and a lateral perimeter p2, delimiting an area A2. The thickness s2 of the outer pane 11 is comprised between 1.4 mm and 1.8 mm, preferably 1.6 mm.

The intermediate layer 12 is essentially a foil material. In particular, the intermediate layer 12 has a thickness s3 and a lateral perimeter p3. The thickness s3 is comprised between 0.5 mm and 0.81 mm. According to the illustrated example, the intermediate layer 12 is completely superimposed on the outer glass 11. In other words, the intermediate layer 12 has a lateral perimeter p3 equal to and superimposed on the perimeter p1 of the outer glass 11. According to a variant not shown, the perimeter p3 of the intermediate layer 12 is different, e.g. it is equal to and superimposed on the perimeter p2 of the inner glass 10.

Advantageously, the area A1 of the inner glass 10 is greater than the area A2 of the outer glass 11.

According to the example illustrated in FIG. 5, the perimeter p1 of the inner glass 10 has: a lower side 40, an upper side 41 opposite each other; and, a front side 42 and a rear side 43 opposite each other. The lower side 40 is recessed, in use, within the door 6 and extends horizontally along the longitudinal axis X. The upper side 41 extends, in use, along the longitudinal axis X and is configured to interact with the gasket 9, as will be illustrated below.

The perimeter p2 of the outer glass 11 is similar to the perimeter p1 of the inner glass 10 and has, in turn: a lower side 50, an upper side 51, a front side 52 and a rear side 53.

The lower side 40 of the inner glass 10 protrudes below the lower side 50 of the outer glass 11. The geometry of the lower side 40 of the inner glass 10 is variable. The lower side 40 of the inner glass 10 is configured to be connected (in a known, non-illustrated manner) to a kinematic drive mechanism located inside the door 6. The lower side 50 of the outer glass 11 has a smaller extension along the axis X than the lower side 40 of the inner glass 10.

The front side 42 of the inner glass 10 is parallel to and/or superimposed on the front side 52 of the outer glass 11. The rear side 43 of the inner glass 10 is parallel and/or superimposed on the rear side 53 of the outer glass 11.

According to the example illustrated, the central portion with base thickness W1 corresponds to the overlapping zone between the area A1 of the inner glass 10 and the area A2 of the outer glass 11.

The value of the base thickness W1 is given by the following relation:

$$W1 = s1 + s2 + s3;$$

wherein, s1 is the thickness of the inner glass;

s2 is the thickness of the outer glass;

s3 is the thickness of the intermediate layer;

According to the illustrated example, the base thickness W1 is comprised between 4.9 mm and 5.91 mm.

Advantageously, the crystal 8 has an edge 14 with a reduced thickness W2. According to the illustrated example, the edge 14 is given by the portion of inner glass 10 and the portion of intermediate layer 12 that protrude laterally outside the perimeter p2 of the outer glass 11. In particular, the reduced thickness W2 is comprised between 3.5 mm and 4.11 mm.

According to a variant not shown, the edge 14 with reduced thickness W2 is achieved by reducing only the thickness of the outer glass 11 without exposing the intermediate layer 12. In this case, the reduced thickness W2 is comprised between 3 mm and 3.3 mm.

According to a variant not shown, the edge 14 with reduced thickness W2 could be obtained by having only the inner glass 10 or a reduced portion of the inner glass 10 protrude outside the perimeter p2 of the outer glass 11.

According to the illustrated example, the edge 14 extends along the upper and lateral zone of the outer glass 11. In particular, the crystal 8 has an edge 14 protruding outside the perimeter p2 along the upper side 41. The shape and size of the edge 14 are variable.

The edge 14 of the crystal 8 is configured to couple in a releasable manner with the gasket 9, as will be illustrated below.

As illustrated in FIGS. 3 and 4, the body 2 has a groove 15 which is configured to house the gasket 9 and delimits the opening 7 at the top and sides. The shape and size of the groove 15 are variable.

According to the example illustrated, the groove 15 has a U-shaped section with concavity facing the opening 7. In particular, the groove 15 is delimited by an inner wall 16, an upper wall 18 and an outer wall 19. The inner wall 16 and the outer wall 19 are opposite each other and extend substantially vertically below the upper wall 18. Advantageously, at least the lower end of the outer wall 19 is inclined with respect to the crystal 8 by an angle α.

The gasket 9 is fitted, in a known manner and illustrated schematically, with a shape coupling and/or by interference into the groove 15.

According to the present invention, the gasket 9 comprises: a transversal lip 20, a lateral lip 21, and a coupling portion 22. The coupling portion 22 is configured to couple and secure the gasket 9 inside the groove 15. The shape, size and type of the coupling portion 22 are variable.

When the crystal 8 is in the lower position Z1 (FIG. 3), the transversal lip 20 protrudes horizontally outwards from the coupling portion 22. The transversal lip 20 is configured to be put in contact, in use, against the inner surface of the crystal 8.

The lateral lip 21 protrudes vertically from the coupling portion 22.

The transversal lip 20 and the lateral lip 21 are facing each other and spaced apart. The transversal lip 20 and the lateral lip 21 are flexible. The transversal lip 20 and the lateral lip 21 are made of polymer material. Preferably, the transversal lip 20 and the lateral lip 21 are hollow.

The lateral lip 21 has an end 23 that is configured, in shape and size, to cover the edge 14 of the crystal 8, when the crystal 8 is in the upper position Z2 (FIG. 4). The shape and size of the lateral lip 21 are variable.

Advantageously, the end 23 is configured to cover the edge 14 and come into direct contact with the outer surface of the outer glass 11. In particular, the end 23 of the gasket 9 is configured to be tight and make a seal between the body 2 and the outer surface of the outer glass 11.

In use, when the crystal 8 according to the present invention is placed in the upper position Z2 to close the opening 7, the crystal 8 presses against the gasket 9 so that there are two distinct sealing zones:

An inner sealing zone G1 between the edge 14 and the lateral lip 21;

An outer sealing zone G2 between the outer glass 11 and the lateral lip 21.

The inner sealing zone G1 and the outer sealing zone G2 abut against the lateral lip 21. In other words, both sealing zones G1 and G2 go against a single flap of the seal 9.

Advantageously, the presence of the end 23 makes it possible to locally reduce the dimensions of the lateral lip 21 and, at the same time, achieve a seal against the outer surface of the crystal 8.

Advantageously, the edge 14 with reduced thickness W2 provides sufficient space within the groove 15 and masked from the outside to accommodate the end 23 of the lateral lip 21.

Advantageously, the inclination of the outer wall 19 of the groove 15 makes it possible to reduce the distance d1 between the body 2 and the outer glass 11 at the junction point. In other words, the body 2 shrinks in the vicinity of the gasket 9.

Advantageously, the gasket 9 is shaped in such a way as to accommodate the inclination of the outer surface of the body 9 in the vicinity of the crystal 8.

It follows from the above that the gasket 9 is shaped to fit both the sloping and narrowed portion of the body 2 and the stepped shape of the crystal 8.

A door glass 4 of the type described above has a reduced distance d1 at the junction point between the crystal 8 and the outer surface of the body 2 with respect to known solutions. In particular, a door glass 4 according to the present invention allows for a door glass 4 with a "flush glass" effect in which the crystal 8 is substantially flush with the body 2, increasing the perceived quality of the motor vehicle 1 itself.

The invention claimed is:

1. A crystal for a door glass of a motor vehicle and comprising:

a first portion having a first thickness and a first lateral perimeter; and a second portion protruding outside the first lateral perimeter and having a second thickness;

wherein said first portion and second portion comes into contact, in use, with a gasket of said door glass; the second portion protruding outside the first lateral perimeter wherein said first thickness is greater than said second thickness; the crystal going, in use, against a single lateral lip of the gasket; the crystal being configured to obtain, in use, two distinct sealing zones: a first sealing zone between the second portion and the lateral lip; and a second sealing zone between the first portion and the lateral lip.

2. The crystal according to claim 1 and comprising: a first glass, a second glass and an intermediate layer which are superimposed on each other; wherein, the intermediate layer is interposed between the first glass and the second glass; wherein, said first thickness is given by the following relation:

$$W1 = s1 + s2 + s3;$$

wherein, s1 is the thickness of the first glass;

s2 is the thickness of the second glass;

s3 is the thickness of the intermediate layer;

said second thickness being given by the thickness reduction or absence of:

said first glass or said second glass and/or said intermediate layer.

3. The crystal according to claim 2, wherein the first lateral perimeter of the first glass delimits a first area; wherein, the second lateral perimeter of the second glass delimits a second area; wherein, said first thickness is in correspondence of the overlapping zone between said first area and said second area.

4. The crystal according to claim 3, wherein the first glass protrudes, at least partially outside said second lateral perimeter forming an edge which is configured to couple, in use, in a releasable manner with the gasket.

5. The crystal according to claim 3, wherein the first area is greater than the second area.

6. The crystal according to claim 2, wherein the thickness of the first glass is comprised between 3 mm and 3.3 mm.

7. The crystal according to claim 6, wherein the first glass is an inner glass and has been heat-treated.

8. The crystal according to claim 2, wherein the thickness of the second glass is comprised between 1.4 mm and 1.8 mm.

9. The crystal according to claim 8, wherein the second glass is an outer glass and has been heat-treated.

10. The crystal according to claim 2, where the thickness of the intermediate layer is comprised between 0.5 mm and 0.81 mm.

11. The crystal according to claim 10, wherein the intermediate layer is made of polymer material.

12. The crystal according to claim 2, wherein the thickness of the first glass is 3.15 mm.

13. The crystal according to claim 2, wherein the thickness of the second glass is 1.6 mm.

14. A gasket comprising:

a transversal lip, a single lateral lip, and a coupling portion;

wherein, the coupling portion is configured to couple, in use, with a groove of a motor vehicle;

wherein the transversal lip protrudes horizontally from the coupling portion and is configured to be put in contact, in use, against the inner surface of a crystal for a door glass of a motor vehicle; the crystal comprising: a first portion having a first thickness and a first lateral perimeter; and a second portion protruding outside the first lateral perimeter and having a second thickness;

wherein, the lateral lip protrudes vertically from the coupling portion; wherein the lateral lip has an end which is configured to form two distinct sealing zones: a first sealing zone against the second portion of said crystal; and a second sealing zone against the first portion of said crystal.

15. A door glass comprising a crystal and a gasket; the crystal comprising, in turn: a first portion having a first thickness and a first lateral perimeter; and a second portion protruding outside the first lateral perimeter and having a second thickness; wherein, said door glass has a groove which houses said gasket; wherein said groove is, in section, U-shaped with a concavity facing the crystal; wherein, the groove is delimited by an inner wall, an upper wall and an outer wall of the door glass-; wherein, the inner wall and the outer wall are opposed and extend substantially vertically beneath the upper wall; the gasket comprising: a transversal lip, a single lateral lip, and a coupling portion; wherein, the coupling portion couples with said groove; wherein the transversal lip protrudes horizontally from the coupling portion and is configured to be put in contact, in use, against the inner surface of the crystal; wherein, the lateral lip protrudes vertically from the coupling portion; wherein the lateral lip has an end which is configured to form two distinct sealing zones: a first sealing zone against the second portion of said crystal; and a second sealing zone against the first portion of said crystal.

* * * * *